July 24, 1962
R. E. DUMAS
3,045,490
PRESSURE MEASURING INSTRUMENT
Filed Dec. 31, 1956
3 Sheets-Sheet 1
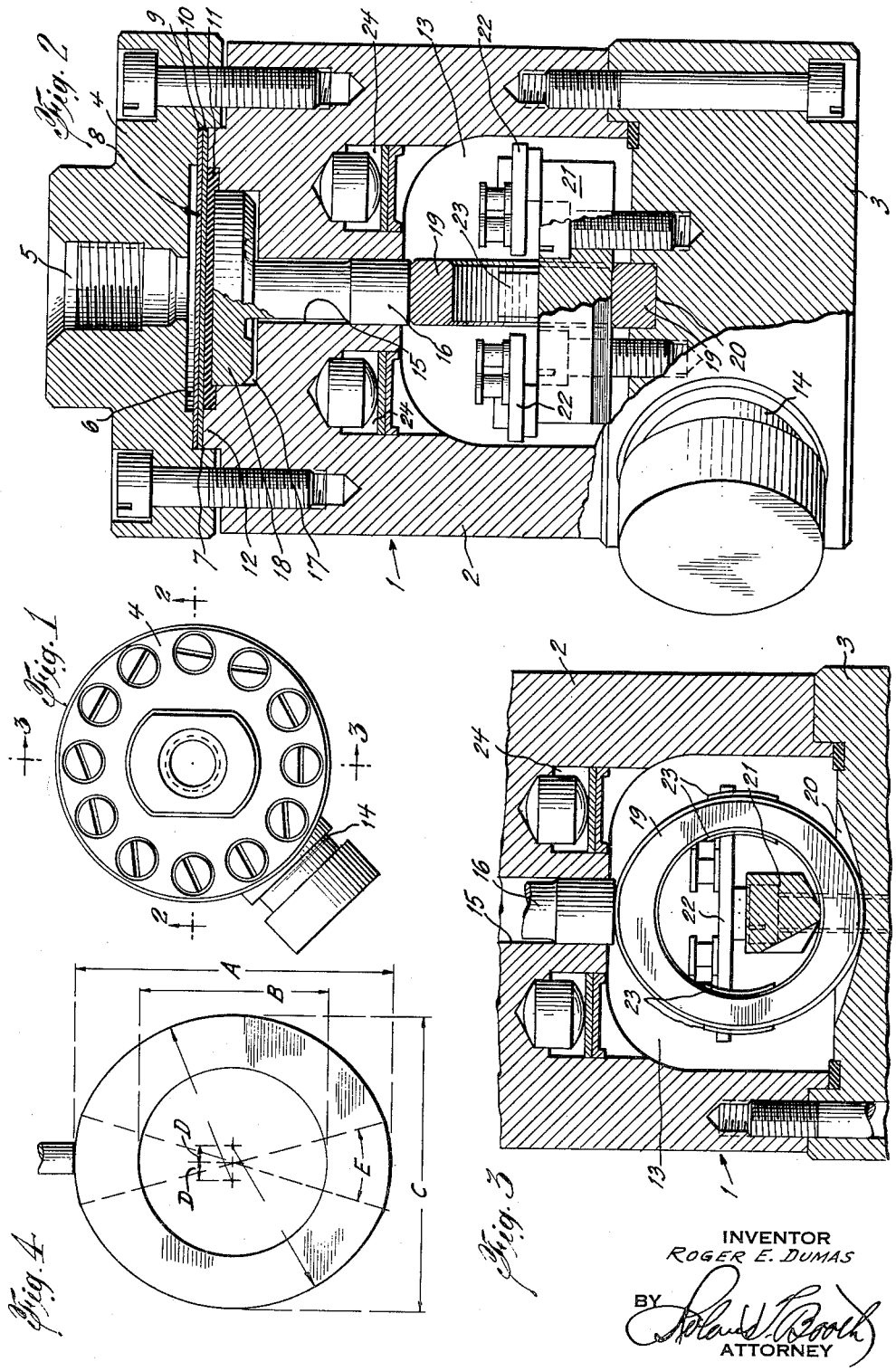
INVENTOR
ROGER E. DUMAS
BY
ATTORNEY July 24, 1962  R. E. DUMAS  3,045,490
PRESSURE MEASURING INSTRUMENT
Filed Dec. 31, 1956  3 Sheets-Sheet 2

INVENTOR
ROGER E. DUMAS
BY
ATTORNEY

July 24, 1962 R. E. DUMAS 3,045,490
PRESSURE MEASURING INSTRUMENT
Filed Dec. 31, 1956 3 Sheets-Sheet 3
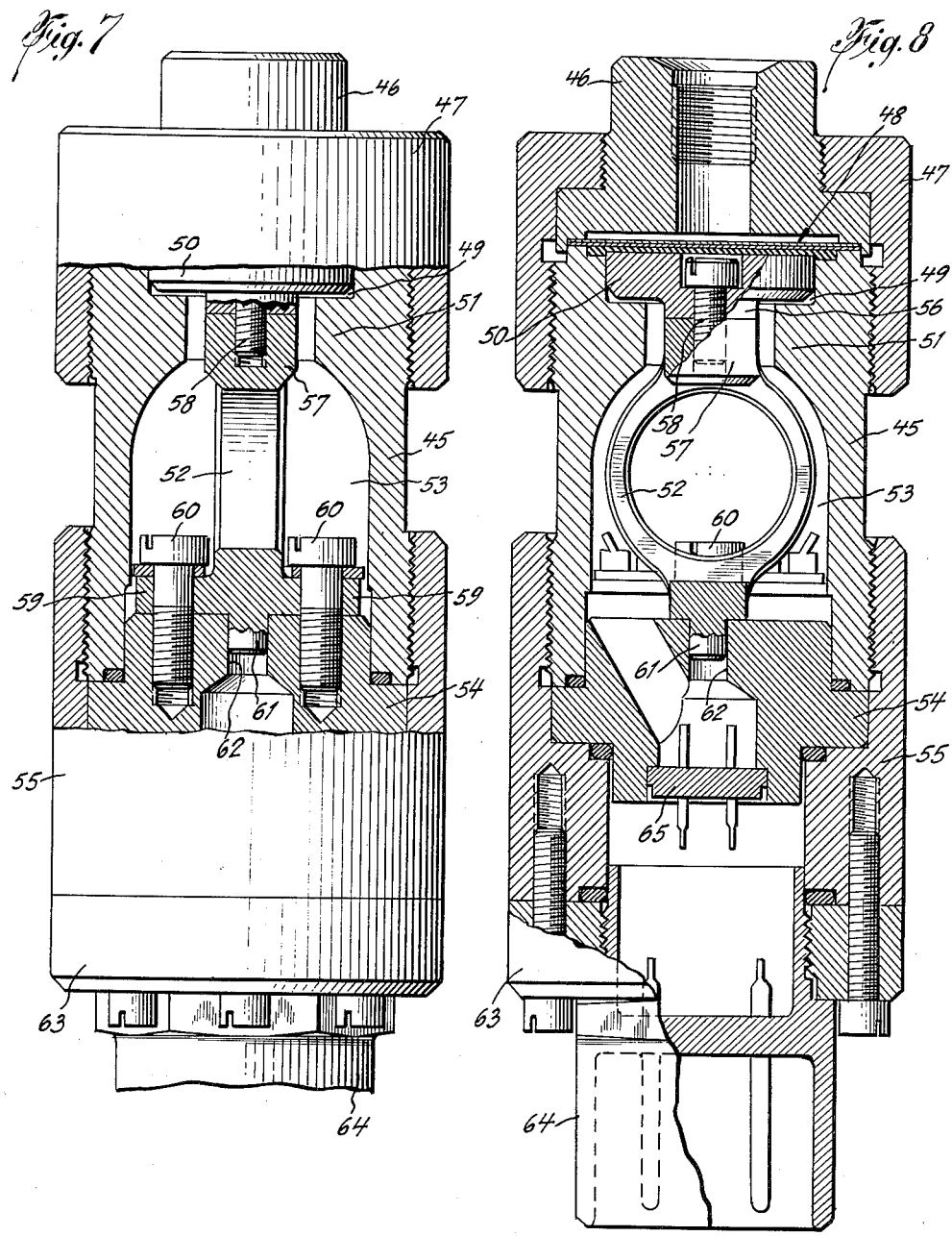
INVENTOR
ROGER E. DUMAS
BY
ATTORNEY

United States Patent Office 3,045,490
Patented July 24, 1962

3,045,490
PRESSURE MEASURING INSTRUMENT
Roger E. Dumas, Snyder, N.Y., assignor to Taber Instrument Corporation, North Tonawanda, N.Y., a corporation of New York
Filed Dec. 31, 1956, Ser. No. 631,788
10 Claims. (Cl. 73—398)

The present invention relates to pressure measuring instruments particularly adapted for measuring variations in fluid pressure.

The invention provides a pressure measuring instrument for use in guided missiles, jet airplanes and other similar applications where it is desirable to measure, control and record information regarding various types of fluid flow in the operation of the airplane, missile, or the like. The instrument is designed to measure variations in pressure with substantial accuracy even though it is subject to rather intense vibration and substantial variations in temperature in the unit or device in which it is mounted for pressure measurement.

The invention provides an instrument for measuring variations in fluid pressure having a flexible fluid and vapor barrier and a force transmitting member for applying force to a sensing ring in which the force transmitting member and casing are provided with complementary portions for engagement to limit the movement of the force transmitting member in the casing to a predetermined amount for preventing damage to the barrier and sensing ring from excessive pressures or variations of the fluid pressures being measured. This means for limiting the movement of the force transmitting member may be in the form of a shoulder formed on the instrument casing or on an insert mounted in the instrument casing. This shoulder is normally positioned to provide clearance between the shoulder and the force transmitting member for the desired movement of the member in measuring fluid pressures within the range of the instrument.

The invention further provides an instrument having a flexible barrier at one end attached to and communicating with the fluid conduit in which the fluid pressure variations are to be measured. A force transmitting means is arranged in the casing with one portion engaged with the flexible barrier and another portion engaging the periphery of a sensing ring. The diametrically opposite portion of the sensing ring is secured to the other end of the casing. Means is provided for limiting movement of the sensing ring and flexible barrier to prevent damage under excessive pressure. This means may be in the form of a shoulder on the casing positioned to engage a portion of the force transmitting means to limit movement of said means by excessive fluid pressure and prevent damage to the flexible barrier or sensing ring. The invention contemplates any suitable means for limiting movement of the force transmitting means under excessive pressure where the means is mounted in the casing and adapted to limit movement of the means to protect the barrier and sensing ring from damage.

The invention comprehends the provision of an instrument employing a proving ring type of metallic spring with means for applying stress to the spring in accordance with variations in pressure or force of all kinds, such as, in a fluid line connected to the casing, in which the proving ring type spring is of a symmetrical contoured form having the diametrically opposite portions of greater thickness than the portions at right angles thereto. With the contoured form of the calibrated spring proving ring of this invention, the portions of the ring intermediate to portions on the diameter receiving the applications of pressure are substantially twice as sensitive to pressure variations as the portions where the pressure is applied. This results in providing a contoured sensing ring having a symmetrically tapering thickness between the thicker and thinner portions in which greater forces can be applied to the ring and suitable measurements can be made at the thinner portions to provide substantially greater sensitivity so that less deflection of the flexible barrier is required for electrical output, thereby increasing the operating life of the barrier in the operation of instruments for measuring fluid pressure variations.

The invention provides an instrument in which the casing mounts a sensing or proving ring having one portion secured to one end of the casing and the diametrically opposite portion positioned to receive pressure variations or force from any source, such as a fluid conduit, for applying stress to the sensing ring so that means associated with the sensing ring will measure the changes in the ring and record or indicate the force or pressure variations, such as in the fluid conduit. The fluid pressure variations may be transmitted to the ring by means of a flexible barrier, or the combination of a flexible barrier and a force transmitting member in which the barrier isolates the fluid in the conduit from the instrument and which the force transmitting member transmits the pressure directly to the sensing ring. Any suitable means may be used for measuring the variations in pressure through the ring, such, for example, as resistance type strain gauges applied to the surface of the ring for operating, indicating and recording instruments electrically connected to the strain gauges, or by other types of measuring means that may have parts associated with the sensing or proving ring.

The invention provides a pressure measuring instrument having a casing formed of a body, a base and a cap detachably secured to the body. The casing is formed between the body and the cap to provide a chamber for housing a flexible fluid and vapor barrier with a portion on one side open through the cap to a fluid conduit connected with the cap. The opposite side of the flexible barrier is open to a passage formed in the body for a force transmitting member having one portion engaging the barrier. Another portion of the force member engages one portion of the periphery of a sensing or proving ring while the diametrically opposite portion is secured to the base. The instrument provides a recess in the body for receiving the force member and for limiting its movement relative to the body under excessive fluid pressure to prevent damage to the calibrated proving ring and flexible barrier.

The invention provides a measuring instrument in which the casing has the body portion formed with a recess for removably receiving an insert. The insert is formed with an opening aligned with the passage in the body for receiving the force transmitting member. The insert may be formed with a recess for receiving a plate portion forming part of the force transmitting member. The plate portion supports the flexible barrier and engages the insert to limit movement of the force member under excessive pressure. The insert provides a more convenient means for assembling the force transmitting member in the body, as well as providing for the use of softer metals in the construction of the body, while the insert will be formed of substantially harder metal for accurately retaining and guiding the force transmitting member in the operation of the instrument.

The invention provides an instrument wherein the force transmitting member and the sensing ring are provided with projections engaged with one another so that the force member and the sensing ring may be rigidly secured together and the sensing ring rigidly secured to the casing. This provides an instrument wherein the force member is retained in connection with the ring to prevent out of phase vibration of the ring whenever fluid or other pressures fluctuate at sufficiently high frequencies which might cause out of phase vibration between the force member and the proving ring sensing element.

In the drawings:

FIG. 1 is a plan view showing the end of the casing provided with the cap.

FIG. 2 is a vertical transverse cross-section taken substantially on line 2—2 of FIG. 1 with portions shown in elevation.

FIG. 3 is a fragmentary vertical cross-section taken substantially on line 3—3 of FIG. 1.

FIG. 4 is an enlarged side elevation diagrammatically illustrating the contoured spring sensing or proving ring.

FIG. 7 shows a side elevation of another form of the instrument with portions broken away and shown in vertical cross-section illustrating a flexible barrier supporting plate and sensing or proving ring formed with projections for rigidly attaching the proving ring to the casing and the supporting plate.

FIG. 8 is a vertical fragmentary cross-section with portions shown in elevation, taken at right angles to FIG. 7, to illustrate details of construction for securing the support plate to the proving ring spring element and the ring element to the casing.

Figure 5:
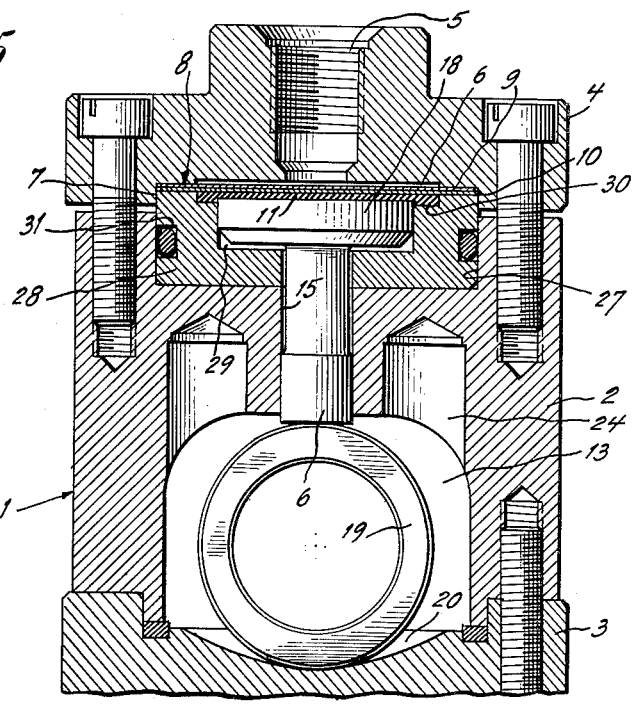
FIG. 5 is a fragmentary cross-section, similar to FIG. 2, showing a modified form of instrument in which an insert is used for receiving and guiding the flexible barrier and force transmitting means and acting as the stop for the force transmitting means.

The instrument provided by the present invention has a casing 1 formed of a body 2, base 3 and cap 4. Cap 4 is formed with a passage 5 and suitable means at the outer end portion of the passage for attaching a fluid conduit to the cap. Cap 4 is formed with a chamber 6 on the inner portion about the inner end of passage 5 opening into a recess 7 formed in the inner face portion. Recess 7 is larger than chamber 6 and provides a seat for the marginal portion of flexible fluid and vapor barrier 8 closing chamber 6 at the inner face of the cap. Flexible barrier 8 may include seal 9 formed of an inert film to prevent the passage of corrosive fluid, a metallic foil sheet 10 forming a vapor barrier and button 11 formed of pressure distributing material such as plastic or rubber, as shown in FIG. 2. Seal 9 protects the barrier from the action of corrosive fluids from the conduit attached to cap 4. Button 11 is mounted on the other side of the metallic foil 10.

Casing 1 is constructed of suitable material, such as stainless steel, to withstand intense vibration and has the several parts constructed with wall portions of substantial thickness to provide a substantially rigid and rugged instrument structure. Body 2 has projection 12 on one end slidably engaging cap 4 in recess 7. This projection is longer than the depth of the recess so the end will engage flexible barrier 8 and compress it against the shoulder on the cap with seal 9 when the cap is secured on the body in assembled relation by a plurality of screws, as shown in FIGS. 1 and 2.

The opposite end of body 2 is formed with a chamber 13 opening through the end of the body and normally closed by base 3 securely bolted to the end of the body with suitable sealing means. Base 3 is formed with an outlet passage for electrical wiring opening through one side of the base and fitted with an electrical connector of conventional type well known in the art and indicated diagrammatically at 14. This connector is the type that will provide a hermetic seal for the wiring connections between the chamber 13 and the exterior of the casing. The joints between the base, cap and body are also hermetically sealed.

Body 2 is formed with a passage 15 for movably receiving force transmitting member 16. The end of the body mounting cap 4 is formed with an annular recess 17 opening through the end of the body, as shown in FIG. 2, and having an enlarged outer end portion formed to receive the marginal portion of button 11. Annular recess 17 is coaxial with passage 15. Force member 16 has an annular plate 18 on the outer end with the end surface engaging button 11 for operation by flexible barrier 8 in accordance with fluid pressure variations in the conduit connected to the cap, while the margin of button 11 beyond plate 18 fills the enlarged outer end of recess 17 to insure full transmission of pressure variations to plate 18. The inner face of plate 18 is normally spaced from the surface of body 2 at the inner end of recess 17. The body and plate 18 provide complementary means on force member 16 and a seat on the body for cooperation to limit movement of force member 16 in the passage to a predetermined amount for preventing damage to the instrument when excessive pressures occur in the conduit connected to cap 4. The inner face of plate 18 engages the body at the inner end of recess 17 in limiting movement of the force member and barrier under excessive fluid pressure. The periphery of plate 18 is slidably engaged with body 2 in recess 17.

The inner end of passage 15 opens into chamber 13 and has the force member engaging one portion of the periphery of spring sensing or proving ring 19. Sensing ring 19 is housed in chamber 13 and has the diametrically opposite portion to that engaged with the force member secured by retainer bar 21 in channel 20 formed in base 3. Screws secured in base 3 engage retainer bar 21 and rigidly retain it and ring 19 firmly engaged with base 3 in channel 20, as shown in FIGS. 2 and 3. The portion of ring 19, opposite that engaging the force member, engages with the inner surface of base 3 at the bottom of channel 20 which is formed with a slightly greater radius than the outer surface of the ring, so an area of the ring at opposite sides of the ring diameter coaxial with the axis of the force member will be in engagement with the base.

Terminal boards 22 are mounted on the ends of retainer bar 21, as shown in FIGS. 2 and 3, for receiving electrical terminal connections for the electrical means cooperating with sensing ring 19 in measuring fluid pressure variations in the conduit. This electrical means may be in the form of resistance type strain gauges 23 mounted on the inner and outer peripheries of ring 19 midway between the portions of the ring engaging the force member and base. Wires extending from the terminal boards through connector 14 extend to conventional electrical recording or registering apparatus for measuring variations in fluid pressure in said conduit. A conventional form of Wheatstone bridge circuit includes strain gauges 23, in the arms thereof, in providing means for measuring fluid pressure variations in the conduit, in a manner well understood in the art.

Body 2 is formed with recesses 24 communicating with chamber 13 for housing silica gel pellates which absorb the moisture in the air in the chamber.

There are some applications for the instrument including the present invention where it is desirable to use other metals than stainless steel in the construction of the casing. Aluminum may be used, for example, in the construction of the casing, including the body, base and cap as shown, for example, in FIG. 5. In using metals like aluminum, it is desirable to modify the body structure as shown in FIG. 5. The same numerals are used on corresponding parts as are used in FIGS. 1 to 3. Body 2 has the end mounting the cap, as shown in FIG. 5, formed with a cylindrical recess 27 opening through the end of the body. An insert 28 of stainless steel or other suitable metal harder than that used for the body is formed of cylindrical sh pe and of a size to slidably engage in recess 27. Insert 28 is formed with an opening coaxially aligned with passage 15 in the body. An annular recess 29 is formed in the outer end of insert 28 for slidably receiving annular plate 18 on force member 16. Insert 28 has a seat 30 about the outer periphery of recess 27 for receiving button 11 in the same manner as shown in FIGS. 2 and 3. An annular groove 31 is formed in insert 28 receiving an O-ring for hermetically sealing the insert in the body. The insert provides a face at the bottom of recess 29 which is normally spaced from the adjacent face of annular plate 18 on the force member to allow for normal operation of the member in sensing and transmitting variations in pressure to the sensing ring for measurement. However, when excessive fluid pressures which would be likely to injure the instrument are applied to the flexible barrier, the plate will engage the face at the bottom of recess 29 and limit movement of the force member so that the sensing ring will not be stressed beyond its elastic limit and thereby avoid injury to the barrier, ring and gauge means used in measuring fluid pressure variations.

Figure 6:
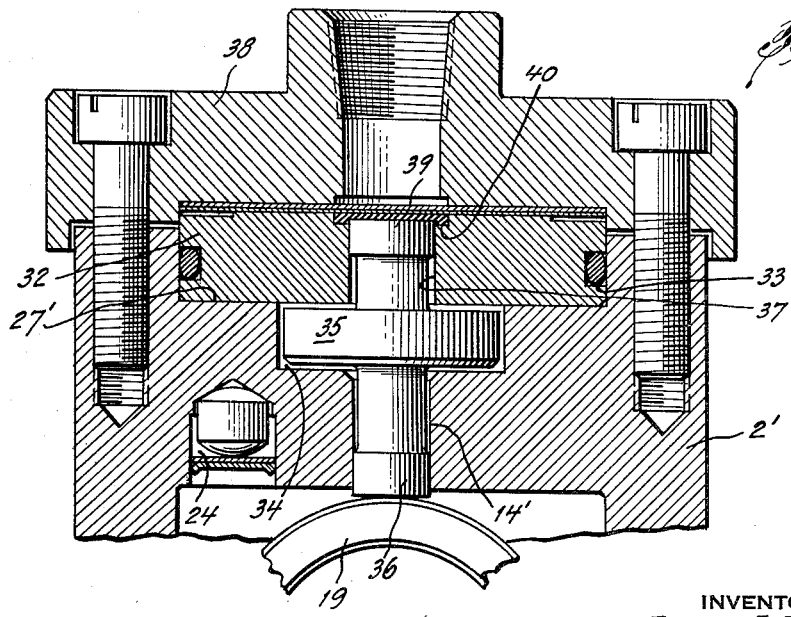
FIG. 6 shows another modified form of the instrument shown in FIG. 2, in which an insert is provided in the casing formed with an opening for receiving and guiding one end of the force transmitting member and limiting the movement of the member and flexible barrier in one direction to a predetermined amount through engagement of the member with the insert.

There are applications for the instrument where it may not be desirable to have the large disc or plate on the force transmitting member engaging the flexible member, as shown in FIGS. 2, 3 and 5. The modification shown in FIG. 6 is used for these applications. Body 2' has a cylindrical recess 27', the same as shown in FIG. 5, which receives an insert 32 similar to insert 28 slidably fitting in the body in recess 27'. An annular groove 33 in the periphery of insert 32 receives an O-ring for sealing the insert in the body. Body 2' in the form shown in FIG. 6 has a smaller recess 34 coaxial with the passage and opening into cylindrical recess 27' for slidably receiving plate portion 35 formed intermediate the ends of force transmitting member 36. The upper end of member 36 movably engages in opening 37 formed in insert 32 and the lower end movably engages in passage 14' in body 2'.

The cap 38, shown in FIG. 6, is larger than cap 4 of FIG. 2, but has similar construction for attachment to a fluid conduit and has a recess for seating the same seal and metallic foil as FIG. 2. A smaller button 39 is used between the end of member 36 and the barrier having the marginal portion seated in an annular seat portion 40 formed in insert 32 about opening 37. Beyond this seat portion 40, insert 32 is formed to seat against the flexible barrier and provide a seal with the adjacent end face of cap 38. Plate portion 35 provides complementary means on the force transmitting member for engaging the insert and the body whenever excessive fluid pressures cause an abnormal movement of the barrier and force transmitting member in the body. Plate portion 35 will engage the body in the end of recess 34 whenever excessive fluid pressures move the member 36 too great a distance and thereby protect the sensing ring and flexible barrier against damage.

Another modification of the instrument is shown in FIGS. 7 and 8. Body 45 has cap 46 secured thereto by ring 47 with flexible barrier 48 sealed on the end of the body by the cap. Cap 46 is formed for attachment to a fluid conduit so that fluid pressure may be conducted through the cap to the barrier. Body 45 has a recess 49 formed in the end adjacent the cap slidably receiving force transmitting plate 50 for slight movement in the body. The movement of plate 50 in the recess is limited by shoulder 51 on the body at the inner end of the recess so that excessive fluid pressures may only move the plate a given or predetermined amount. This limited plate movement prevents movement sufficient to damage sensing ring 52. Recess 49 has the inner end opening into a passage connecting with chamber 53 in the opposite end of body 45. A base member 54 is sealed on the end of body 45 by retaining ring 55.

Plate 50 is formed with a cylindrical projection 56 having a flat end seated against the flat end of head 57 formed on sensing ring 52. The central portion of plate 50 is recessed to receive the head of securing screw 58. The shank of screw 58 extends through the plate and is threaded into head 57 for rigidly securing the plate and sensing ring together. The portion of sensing ring 52 diametrically opposite head 57 is formed with attaching ears 59 extending from opposite sides of the ring. Suitable means, such as screws 60, extend through apertures in ears 59 and threadedly engage in threaded openings in base member 54 for rigidly attaching the sensing ring to the base member. A locating projection 61 is formed on the sensing ring, as shown in FIGS. 7 and 8, for slidable engagement in locating bore 62 formed in the center of base member 54 for locating sensing ring 52 in axial alignment with recess 49. Screws 60 may also be used to mount the terminal boards in chamber 53 of the body for carrying the electric wire connections between the gauge means on the sensing ring and the registering or recording devices for measuring variations in fluid pressure through the ring and plate. A terminal cap 63 is sealed on the outer end of retaining ring 55 and carries a terminal connector 64 providing a hermetic seal on the end of the casing. A terminal plug 65 seals a passage through base member 54 for the electrical connections between the portions of the measuring means associated with the sensing ring and the portions outside the casing.

The plate and sensing ring construction in FIGS. 7 and 8, with the rigid connection to each other and the casing, is adapted for use with high pressure fluid conduits and where high frequency variations occur in the fluid pressure. When instruments of this character are used in airborne equipment such as jet airplanes, rockets and guided missiles, intense high frequency vibrations occur which affect the instruments unless they are constructed to withstand such vibration. The instrument shown in FIGS. 7 and 8 is constructed to withstand such vibration without affecting its operation. Securing plate 50 to sensing ring 52 prevents out of phase vibration of the plate relative to the ring.

The sensing or proving ring used in the instrument shown in the several figures of the drawing and hereinabove described is constructed essentially as shown in FIG. 4. The diametrically opposite portions engaging the force transmitting member and casing are of greater thickness than the intermediate portions at right angles thereto. Intermediate these two portions the thickness of the spring ring tapers gradually from the thicker portions to the thinner portions at right angles thereto. As an example of a typical spring or ring incorporating the present invention, and with reference to the ring shown in FIG. 4, the inner periphery of the ring is cylindrical and may have a dimension across the diameter indicated at B of .7188 of an inch. The ring may have a width of .311 of an inch. The outer peripheral surface of the ring across the diameter indicated by dimension A may have a dimension of 1.150 inches. The outer dimension C of the ring may be 1.062 inches. D indicates the distance between the center of the circle for the inner cylindrical surface of the ring and the center for the radius of the outer surface of the ring at opposite sides which may be .064 of an inch. The top and bottom portions of the ring shown in FIG. 4 within the arc indicated E, will have the outer surface concentric with the inner surface. The portion of the ring which engages the force transmitting member will preferably have a portion of the outer surface flattened across the width of the ring of approximately .184 of an inch. With a ring having the portions of greater dimension at the points where the load is applied, of the character described above and shown in detail in FIG. 4, the value of stress applied at the loading points is reduced to have the same value as the stress at the portions of least thickness intermediate the loading points. This provides a ring in which a stress of approximately 1.8 times can be applied to the loading points as compared with sensing or proving rings having a uniform cross-section throughout. The sensitivity of the ring with strain gauges applied intermediate the loading points is materially increased, thereby permitting application of increased loads to the ring with increased efficiency of operation of an instrument in comparison with previous instruments.

It will be noted that the thickness of the ring varies between the loading points and the intermediate portions to provide a tapered symmetrical construction. The strain gauges or other stress sensitive means for measuring variations in fluid pressure are applied to the intermediate portions of the ring having minimum thickness. With the contoured ring above described, the movement of the barrier and force member may be reduced to 5 thousandths of an inch compared with 8 thousandths of an inch in other types of instruments. This provides an increase in efficiency of approximately 33 percent when using the instrument made according to the invention as herein described.

The sensing ring provided by the present invention has substantially equal maximum stress at all peak stress points and reduced deflection for an equivalent stress over that provided in a uniform cross-section circular ring. This permits the use of a smaller volume of material to store a given amount of strain energy or, conversely, it could be stated that the volume of material used in the ring is being stressed to a high average level. This results in a reduction of both the size and weight of a ring designed for a particular force and deflection. These properties are of considerable advantage in any type of missile or aircraft design where weight is such a tremendous factor.

It will be understood that the sensing ring herein disclosed provides a substantial improvement in a pressure measuring instrument such as that disclosed in this application in view of the advantages hereinbefore described. This sensing ring is likewise useful with similar advantage in all types of measuring apparatus for measuring all types of force variation.

The flexible barrier herein described provides means to prevent fluid in the conduit from entering into the body where it will damage the instrument because these instruments are made for use in measuring corrosive fluid pressures, such as nitric and sulphuric acids, as well as other fluids of a much less corrosive nature. The barrier, therefore, uses a thin sheet or film of inert plastic or similar material to form seal 9. A very thin metallic foil is used for sheet 10 to provide a vapor barrier next to seal film 9. This is due to the fact that the materials available for use in forming seal 9 may have microscopic pores through which some of the corrosive fluid may have a vapor portion pass as high pressures. In such a case, the vapor barrier, which is made of a non-corrosive metal foil, coperates with the seal to prevent passage of fluid and vapor through the barrier. Button 10 cooperates with the barrier to provide a pressure transmitting element to transmitt fluid pressure variations to the plate or force transmitting member. This button 10 is contained within a recess in the body which has a size and shape to fully contain the button so any pressure variations will be fully transmitted to the force member and proving ring for measurement. A suitable rubber composition is used for the button. This rubber button has the further advantage of covering the edges on the plate or force transmitting member to prevent them from affecting the flexible barrier under high pressures.

The flexible barrier does not have sufficient strength to hold fluid pressures in the cap and requires the support provided by the force transmitting member to support it throughout the portions extending across the chamber in the cap and subjected to fluid pressures. With this barrier construction the full effect of pressure and pressure variations in the fluid conduit attached to the instrument are directly transmitted and applied to the sensing ring for measurement.

While the invention is described and shown in an instrument designed particularly for measuring variations in force or pressure in a fluid conduit, it should be understood that the invention is useful in measuring any type of force or pressure, such as weight, deflection, and all other types of force or pressure without departing from the features and advantages herein set forth. The relation between the force transmitting member and the ring or its equivalent in the casing with the means for limiting movement of the force member will remain substantially the same for all force measuring functions.

The invention claimed is:

1. A pressure measuring instrument comprising a casing having a body, a base and a cap, said cap having communication with a fluid conduit, said cap being mounted on one end of said body, said body and cap being formed with a chamber having communication with said conduit, said body being formed with a passage opening into said chamber at one end and a compartment in said body and base at the other end of said casing, a force transmitting member in said passage, a sensing ring mounted in said compartment having one portion secured to said base and a diametrically opposite portion engaging one end of said member while the other end of said member is in communication with said fluid conduit for movement in response to variations in pressure therein for transmitting said variations to said sensing ring, and means in said body between the ends of said passage for engaging a shoulder on said member projecting outwardly beyond the side of said passage for limiting movement of said member to a predetermined amount within the elastic limit of said ring to prevent damage to said ring by excessive pressure in said fluid conduit.

2. A pressure measuring instrument as claimed in claim 1, comprising a casing having one end communicating with a fluid conduit, and having a recess in said end thereof, an insert mounted in said recess, said casing and insert having a passage formed therein, a force transmitting member movable in said passage having a plate portion overlying one face of said insert and exposed to variations in pressure of fluid in said conduit, and a sensing ring having one portion engaging the other end of said member and a diametrically opposite portion secured to the other end of said casing for sensing variations in pressure of the fluid in said conduit through said member, and said insert being engaged by said plate portion to limit movement of said member in said casing to a predetermined amount for preventing damage to said instrument and the parts thereof.

3. A pressure measuring instrument as claimed in claim 1, comprising a casing member having one end communicating with a fluid conduit and having a recess in said end, an insert removably mounted in said recess, said casing member and insert having a coaxial passage formed therein and one of said members being formed with a chamber adjacent the other member about said passage, a force transmitting member movable in said passage having a plate portion in said chamber attached to said member, said plate portion limiting movement of said member in said passage and chamber to a predetermined amount, said member having one end directed toward said conduit and sensitive to variations in fluid pressure and the other end of said member having a sensing ring engaged therewith, said sensing ring having an opposite portion secured to the other end of said casing, and said sensing ring being sensitive to variations of pressure in said conduit through said member whereby said pressure variations may be measured.

4. A pressure measuring instrument comprising a casing having a body, a base and a cap, said body having a recess in one end opening outwardly through said end and providing a seat on the inner wall portion forming said recess, said cap and body having opposed faces on adjacent end portions thereof, extending about said recess and seat on said body, said cap having a chamber formed in the face thereof adjacent said body within the portion formed with said opposed faces, a flexible diaphragm extending over said chamber in said cap and isolating it from said recess in said body having the marginal portion engaged between and by said opposed faces, means detachably securing said cap on said one end of said body and retaining said diaphragm sealed therebetween, said cap having a passage therethrough communicating with said chamber at one end and adapted for connection to a conduit to expose said diaphragm to pressure in said conduit, said body having a chamber formed in and opening outwardly through the opposite end of said body, means detachably mounting said base on said opposite end of said body in sealed relation, said body formed with a passage extending between said recess in said one end and chamber in said opposite end thereof, a force transmitting member having opposite ends slidably mounted in said passage having one end surface engaging and supporting said diaphragm in the area aligned with said recess in said body, a sensing ring in said chamber in said body secured to said base and having an opposite portion engaging the opposite end surface on said force transmitting member, and sensitive to variations in force applied through said diaphragm to said force transmitting member, and a plate on said force transmitting member projecting normal to the axis thereof within said recess in said one end of the body and having a portion in adjacent spaced parallel relation to said seat on the wall of said body in said recess for limiting movement of said force transmitting member in said body toward said ring to a distance not greater than the elastic limit of said sensing ring for measuring variations in pressure in said conduit.

5. An instrument of the character claimed in claim 4, wherein sealing means is provided between said cap, body and base hermetically sealing the contents of said casing from the outside atmosphere.

6. An instrument of the character claimed in claim 4, wherein a flexible barrier has its marginal portion sealed between said cap and body with the intermediate portion dividing said chamber and in communication on one side with fluid pressure from said conduit and having the other side engaging said other end of said member, means having portions extending through said base and mounted on said sensing ring for measuring variations in fluid pressure in said conduit through variations transmitted to said sensing ring by said barrier and member, and means hermetically sealing said cap and base on said body and the contents of said casing from the outside.

7. An instrument of the character claimed in claim 4, wherein an insert is mounted in said recess cooperating with said member and plate for limiting movement of said member in said body a predetermined amount for protecting said sensing ring against damage from excessive pressure in said conduit.

8. In an instrument for measuring pressure as claimed in claim 1, having a casing connected to a fluid pressure source, and a passage formed therein, the combination of a force transmitting member having attaching means formed on one end, said member being movably mounted in said passage with the other end directed toward said fluid pressure source and movable upon variations in pressure, a sensing ring having attaching means formed on one portion thereof connected to said attaching means on said member, and attaching portions on said sensing ring at a diametrically opposite position from said attaching means thereon, engaged with and secured to said casing whereby said member and sensing ring are sensitive to all pressure variations in said fluid source and retained against out of phase vibration in relation to each other and said fluid source.

9. An instrument of the character claimed in claim 8, wherein the attaching means on said member has endwise abutment with the attaching means formed on said sensing ring, fastening means for securing said attaching means rigidly together in abuting relation, said attaching portions on said ring being formed thereon in outwardly extending relation from said ring and formed for surface engagement with the inner end surface of said casing, and fastening means engaging said attaching portions and rigidly attaching said ring in engagement with said casing.

10. An instrument of the character claimed in claim 4, wherein said barrier comprises an inert seal disposed toward said fluid from said conduit, a metallic foil vapor barrier engaging said seal on the face away from the fluid and a button of flexible plastic force transmitting sheet material engaging said foil, whereby corrosive fluids are retained in said conduit including vapors therein against transmission into said instrument while fully flexing to transmit force to the sensing ring for measurement.

References Cited in the file of this patent

UNITED STATES PATENTS

| | | |
|---|---|---|
| 1,143,338 | Wesener | June 15, 1915 |
| 1,412,698 | Malivert | Apr. 11, 1922 |
| 2,297,678 | Allen | Oct. 6, 1942 |
| 2,508,975 | Sundby | May 23, 1950 |
| 2,585,350 | Russell | Feb. 12, 1952 |
| 2,718,241 | Newell | Sept. 20, 1955 |
| 2,770,703 | Scheurich | Nov. 13, 1956 |

FOREIGN PATENTS

| | | |
|---|---|---|
| 505,182 | France | Mar. 11, 1924 |
| 1,108,620 | France | Sept. 7, 1955 |